United States Patent
Ma et al.

(10) Patent No.: US 10,956,856 B2
(45) Date of Patent: Mar. 23, 2021

(54) OBJECT RECOGNITION FOR A STORAGE STRUCTURE

(71) Applicant: Samsung Electronics Co., Ltd., Suwon-si (KR)

(72) Inventors: Tao Ma, Santa Clara, CA (US); Moe Tanabian, San Jose, CA (US); Chunkwok Lee, Santa Clara, CA (US); Suranjit Adhikari, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 24 days.

(21) Appl. No.: 14/866,396

(22) Filed: Sep. 25, 2015

(65) Prior Publication Data

US 2016/0217417 A1    Jul. 28, 2016

Related U.S. Application Data

(60) Provisional application No. 62/107,344, filed on Jan. 23, 2015, provisional application No. 62/108,992, filed on Jan. 28, 2015, provisional application No. 62/192,730, filed on Jul. 15, 2015.

(51) Int. Cl.
  *G06Q 10/08*    (2012.01)
  *H04N 5/225*    (2006.01)
  *G06K 9/00*    (2006.01)

(52) U.S. Cl.
  CPC ....... *G06Q 10/087* (2013.01); *G06K 9/00771* (2013.01); *H04N 5/225* (2013.01); *G06K 2209/17* (2013.01)

(58) Field of Classification Search
  None
  See application file for complete search history.

(56) References Cited

U.S. PATENT DOCUMENTS

| | | | |
|---|---|---|---|
| 5,474,085 A | 12/1995 | Hurnik et al. |
| 6,377,296 B1 | 4/2002 | Zlatsin et al. |
| 6,842,719 B1 | 1/2005 | Fitzpatrick et al. |
| 6,919,795 B2 | 7/2005 | Roseen |
| 7,270,384 B2 | 9/2007 | Koloff, Jr. et al. |
| 7,529,597 B1 | 5/2009 | Hertz et al. |
| 7,613,330 B2 | 11/2009 | Mirtsching et al. |
| 7,936,271 B2 | 5/2011 | Karr et al. |
| 8,056,817 B2 | 11/2011 | Flood |
| 8,209,219 B2 | 6/2012 | Fitzpatrick et al. |
| 8,256,381 B2 | 9/2012 | Pratt |
| 8,686,831 B2 | 4/2014 | Green et al. |

(Continued)

FOREIGN PATENT DOCUMENTS

| | | | |
|---|---|---|---|
| CN | 102981476 | * | 3/2013 |
| KR | 20060114903 | * | 11/2006 |

OTHER PUBLICATIONS

CN 103363751; Sun et al ; Mar. 30, 2012; english translation.*

*Primary Examiner* — Nancy Bitar

(57) ABSTRACT

In one aspect, a method for detecting an object and/or managing an inventory will be described. A motion of an object is detected at a storage structure. One or more images are acquired of at least a part of the object. A direction of the motion of the object is determined. An object is identified based on the one or more images. In various embodiments, an inventory for the storage structure is updated based on the motion direction determination and the object identity.

27 Claims, 12 Drawing Sheets

(56) References Cited

U.S. PATENT DOCUMENTS

| | | | |
|---|---|---|---|
| 8,688,598 B1 | 4/2014 | Shakes et al. | |
| 8,695,872 B2 | 4/2014 | Braunstein | |
| 8,830,053 B2 | 9/2014 | Benson et al. | |
| 8,836,749 B2 | 9/2014 | Katz | |
| 8,842,151 B2 | 9/2014 | Katz | |
| 9,528,972 B2 * | 12/2016 | Minvielle | A47J 31/44 |
| 10,046,228 B2 * | 8/2018 | Tran | A61B 5/0022 |
| 10,209,691 B2 * | 2/2019 | Minvielle | G05B 13/02 |
| 2007/0131766 A1 * | 6/2007 | Kwak | G06Q 10/0875 235/385 |
| 2011/0135160 A1 * | 6/2011 | Sagan | G06K 9/00577 382/108 |
| 2011/0153614 A1 * | 6/2011 | Solomon | B65G 1/127 707/740 |
| 2011/0318717 A1 | 12/2011 | Adamowicz | |
| 2012/0050531 A1 | 3/2012 | Wu | |
| 2012/0064204 A1 | 3/2012 | Davila et al. | |
| 2012/0116577 A1 | 5/2012 | Ottomanelli | |
| 2012/0130761 A1 | 5/2012 | Mohan | |
| 2012/0130770 A1 | 5/2012 | Heffernan et al. | |
| 2013/0070090 A1 | 3/2013 | Bufalini et al. | |
| 2013/0110580 A1 | 5/2013 | Sholl et al. | |
| 2013/0111936 A1 | 5/2013 | Olson | |
| 2013/0126042 A1 | 5/2013 | Dewald et al. | |
| 2013/0346261 A1 | 12/2013 | Phillips et al. | |
| 2014/0079291 A1 | 3/2014 | Johnson | |
| 2014/0288714 A1 | 9/2014 | Poivet | |
| 2014/0347491 A1 | 11/2014 | Connor | |
| 2015/0035437 A1 | 2/2015 | Panopoulos et al. | |
| 2015/0260699 A1 * | 9/2015 | Minvielle | G01N 33/02 426/231 |
| 2015/0269415 A1 * | 9/2015 | Gelbman | G06K 9/00214 348/207.1 |
| 2016/0088262 A1 * | 3/2016 | Lee | F25D 29/00 704/275 |
| 2016/0150213 A1 * | 5/2016 | Mutti | G06K 9/4604 348/143 |
| 2018/0117447 A1 * | 5/2018 | Tran | G06Q 20/00 |

* cited by examiner

601

| Sugar level | fruit? | |
|---|---|---|
| | yes | no |
| | show information 605 | no information 610 |

| | | fermented food? | |
|---|---|---|---|
| | | yes | no |
| bacteria detection? | yes | bacteria count 615 | warning 620 |
| | no | warning 625 | fresh 630 |

| | | Food item that is edible when overripe? | |
|---|---|---|---|
| | | yes | no |
| overripe | yes | recipe 635 | warning 645 |
| | no | information 640 | message 650 |

FIG. 6C

OBJECT RECOGNITION FOR A STORAGE STRUCTURE

CROSS-REFERENCE TO RELATED APPLICATIONS

This application claims the priority of U.S. Provisional Patent Application No. 62/107,344, entitled "Method for Inventory Tracking Within a Refrigerator Using Triggered Multi-view Cameras," filed Jan. 23, 2015; U.S. Provisional Patent Application No. 62/108,992, entitled "Method for Inventory Tracking Within a Refrigerator Using Triggered Multi-view Cameras," filed Jan. 28, 2015; and U.S. Provisional Patent Application No. 62/192,730, entitled "On-the-fly Food Recognition and Food Quality Inspection," filed Jul. 15, 2015, each of which is incorporated herein in its entirety for all purposes.

FIELD OF THE INVENTION

The present invention relates generally to a process for identifying an object. In various embodiments, the object identification process is used to help manage inventory at a storage structure.

BACKGROUND

Over time, refrigerators have becoming increasingly sophisticated and provide an ever growing array of features. One area, however, which has seen relatively limited progress, is inventory management. That is, a user of a refrigerator typically uses the appliance to store fruits, vegetables, beverages, leftovers and a variety of other foods, items or medicines. However, it is all too easy to forget what items are in the refrigerator, when they were put there and when certain items will expire or should be replaced.

Of course, users can rely upon notes written by hand or inputted into a smartphone or computer. However, such approaches are cumbersome, since the records must be manually and regularly updated to be effective. As a result, it would be beneficial to provide an inventory management system that would allow a user to easily recall and react to the current contents of a refrigerator.

SUMMARY

In one aspect, a method for detecting an object and/or managing an inventory will be described. A motion of an object is detected at a storage structure. One or more images are acquired of at least a part of the object. A direction of the motion of the object is determined. An object is identified based on the one or more images. In various embodiments, an inventory for the storage structure is updated based on the motion direction determination and the identity of the object. Various devices, structures, systems and software that relate to the above method are also described.

The storage structure may include a variety of additional features. In some embodiments, for example, the storage structure includes a scanner that is used to obtain more detailed information about an object. Some approaches involve providing information to a user based on the identity of an object, the scanning of the object and/or the updated inventory records.

The above method may be implemented at a wide variety of storage structures. In some embodiments, for example, the storage structure is a refrigerator. However, it should be appreciated that the storage structure may be any type of structure that is used to help store or hold objects, including but not limited to a cabinet, a storage container, a storage shed and a warehouse.

BRIEF DESCRIPTION OF THE DRAWINGS

The invention and the advantages thereof, may best be understood by reference to the following description taken in conjunction with the accompanying drawings in which:

FIGS. 6A-6C are charts indicating different types of information displayed for a user according to various embodiments of the present invention.

In the drawings, like reference numerals are sometimes used to designate like structural elements. It should also be appreciated that the depictions in the figures are diagrammatic and not to scale.

DETAILED DESCRIPTION

As noted in the Background, there is an ongoing need for improved inventory management systems for storage structures such as refrigerators. Many modern refrigerators lack such systems. That is, they do not remind or inform the user about the contents of the refrigerator. Thus, it is easy for a user to forget what is contained in the refrigerator. As a result, perishable foods may expire, redundant purchases may be made, and needed goods may not be replenished in a timely manner.

Figure 1:
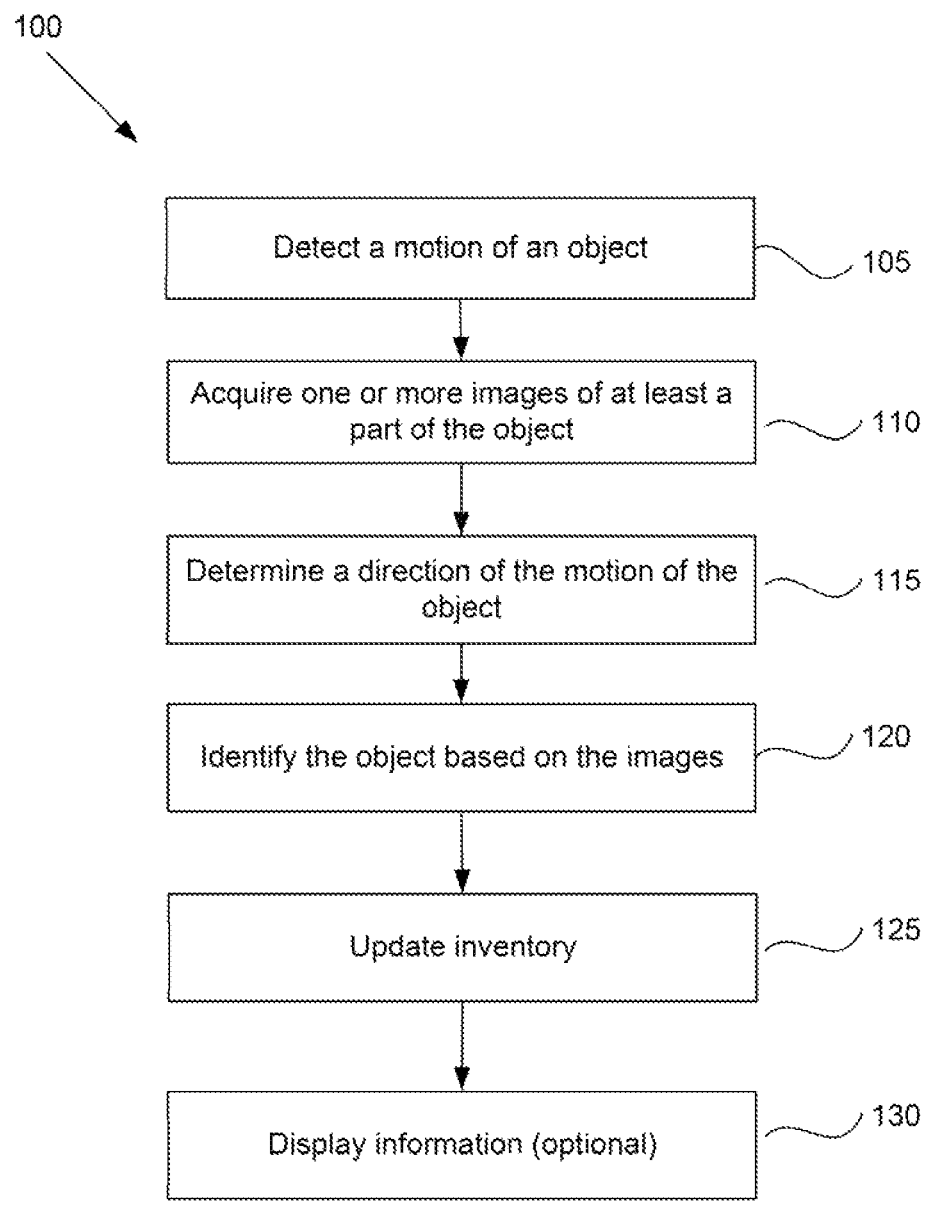
FIG. 1 is a flow diagram illustrating a method for identifying an object and managing an inventory system according to a particular embodiment of the present invention.
Figure 3:
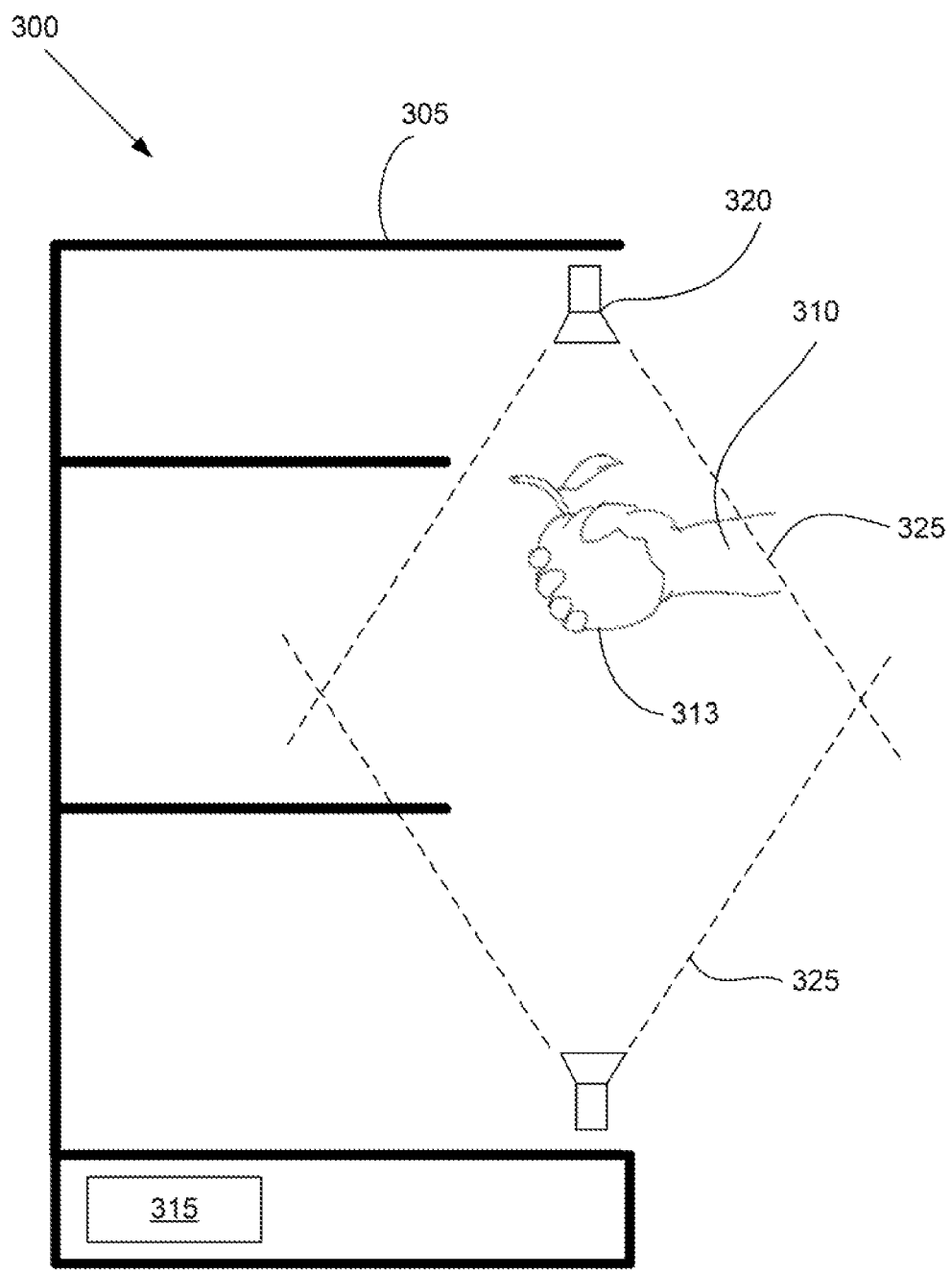
FIG. 3 is a diagram of a storage system according to a particular embodiment of the present invention.

Various implementations of the present invention address one or more of the above issues. Referring now to FIGS. 1 and 3, a method for identifying items and managing an inventory system according to a particular embodiment of the present invention will be described. FIG. 1 is a flow diagram of an example method 100. FIG. 3 illustrates a block diagram of an example storage system 300 that is used to perform the method 100.

The storage system 300 includes a storage structure 305 and a carrier 310 (e.g., a hand of a person, structure or other mechanism that adds an object 313 to or removes an object 313 from the storage structure 305.) The storage structure 305 includes an inventory records database 315 and one or more cameras 320 that are coupled with the storage structure 305. It should be noted that in some embodiments, the inventory records database 315 is (also) stored at a remote device (e.g., a cloud-based server) that is coupled with the storage structure 305 through a network.

In this and other examples in this application, the storage structure 305 is a refrigerator, although it should be appreciated that the methods and technologies described in this application are not limited to a refrigerator. They may be applied to any suitable storage structure, including but not limited to a refrigerator, a shelf, a cabinet, a storage container, a warehouse or any other structure or mechanism for storing or holding items of any kind. The technologies described herein may also be applied to the storage of any item e.g., food, medicines, tools, products, materials, containers, etc.

In this application, a carrier is understood as any structure, object or mechanism that is used to move an object into or out of a storage structure. A wide variety of carriers may be used. In the illustrated embodiment, for example, the carrier 310 is the hand of a user that moves foods or other items into and out of the refrigerator. In other implementations, something other than a user interacts with the storage structure 305. By way of example, if the storage structure 305 is a warehouse, a truck, cart, robot or trolley may be used to move the object into or out of the storage structure. In various implementations, the carrier 310 may be but is not limited to a user, a hand of a user, a vehicle (e.g., a forklift or truck), a carrying tool, a mechanical arm, or any other suitable mechanism.

Referring again to FIG. 1, at step 105 the storage structure 305 detects a motion of an object 313. The object 313 may be any suitable object(s) or item(s). By way of example, if the storage structure 305 is a refrigerator, the object 313 may be food, a container, a consumable item, a beverage, etc. If the storage structure 305 is a warehouse, the object 313 may be a box, a shipping container, a bag, a collection of multiple items, etc. In some embodiments, the storage structure 305 directly tracks the motion of the object 313. Alternatively or additionally, the storage structure 305 indirectly tracks the motion of the object 313 by tracking another, related structure (e.g., by tracking the motion of the carrier 310 that is carrying the object 313.)

In some embodiments, the storage structure 313 is arranged to detect an action that precedes the movement of the carrier 310 or object 313 e.g., the opening of a refrigerator door. As will be discussed later in this application, such actions can trigger the performance of other operations by the storage structure 305, such as the activation of one or more cameras.

The tracked motion, the object and the carrier may vary widely, depending on the needs of a particular application. In the illustrated embodiment, for example, the storage structure 305 is a refrigerator, the carrier 310 is a hand and the hand holds the object 313, which is an apple. The storage structure 305 is arranged to detect when the hand or apple is moved to an entrance area of the refrigerator.

The detection of motion may be performed in any suitable manner. In some embodiments, the storage structure is coupled with or includes one or more motion detectors, cameras and/or scanners that are used to help detect the movement or presence of the object 313, the carrier 310 and/or other related structures and actions.

At step 110, the storage structure 305 acquires one or more images of at least a part of the object 313 and/or the carrier 310. This may be performed in a variety of ways. In some approaches, for example, there are one or more cameras 320 in the storage structure. The cameras 320 are arranged to capture one or more images of the carrier and/or the object. In some embodiments, the capturing of the images by the cameras 320 is triggered by a detected motion (e.g., the detection of motion at an entrance of the refrigerator or the opening of the refrigerator door, as discussed in connection with step 105.) In various approaches, the cameras are triggered when the amount of detected motion exceeds a predetermined threshold.

Some implementations involve multiple cameras 320 that are positioned in a variety of positions inside the storage structure 305. Thus, as the carrier 310 moves the object 313 towards or away from the storage structure 305, the cameras 320 are able to capture multiple images of the carrier and/or the object from different angles. In some embodiments, the cameras 320 are positioned inside or outside the door to the storage structure 320 and/or in the vicinity of or at the entrance to the storage structure 305 so that images of the carrier 310 and/or the object 313 can be captured just as the object begins to enter or leave the storage structure. In various implementations, the cameras 320 are distributed around the storage structure 305 so that they collectively cover an entire entrance into the storage structure. In the illustrated embodiment, for example, the cameras 320 are positioned such that the entrance of the refrigerator is in their field of view 325.

At step 115, the storage structure 305 determines a direction of the motion of the object 313. This may be performed using any suitable technique or technology. In the illustrated embodiment, for example, the carrier 310 (e.g., a hand) is moving the object 313 (e.g., an apple) towards the refrigerator. The cameras 320 capture multiple images of the hand and the apple as they are moving (e.g., step 110.) The storage structure 305 analyzes the images to determine the direction that the hand and the apple are moving i.e., towards, rather than away from, the storage structure. By way of example, the position difference of a moving part of a carrier/hand may be compared between different image frames. Based on the comparison, the storage structure 305 determines the direction the carrier/hand is moving. This directional information is used to help determine whether the object 313 is being removed from or placed into the storage structure 305.

Figure 11A:
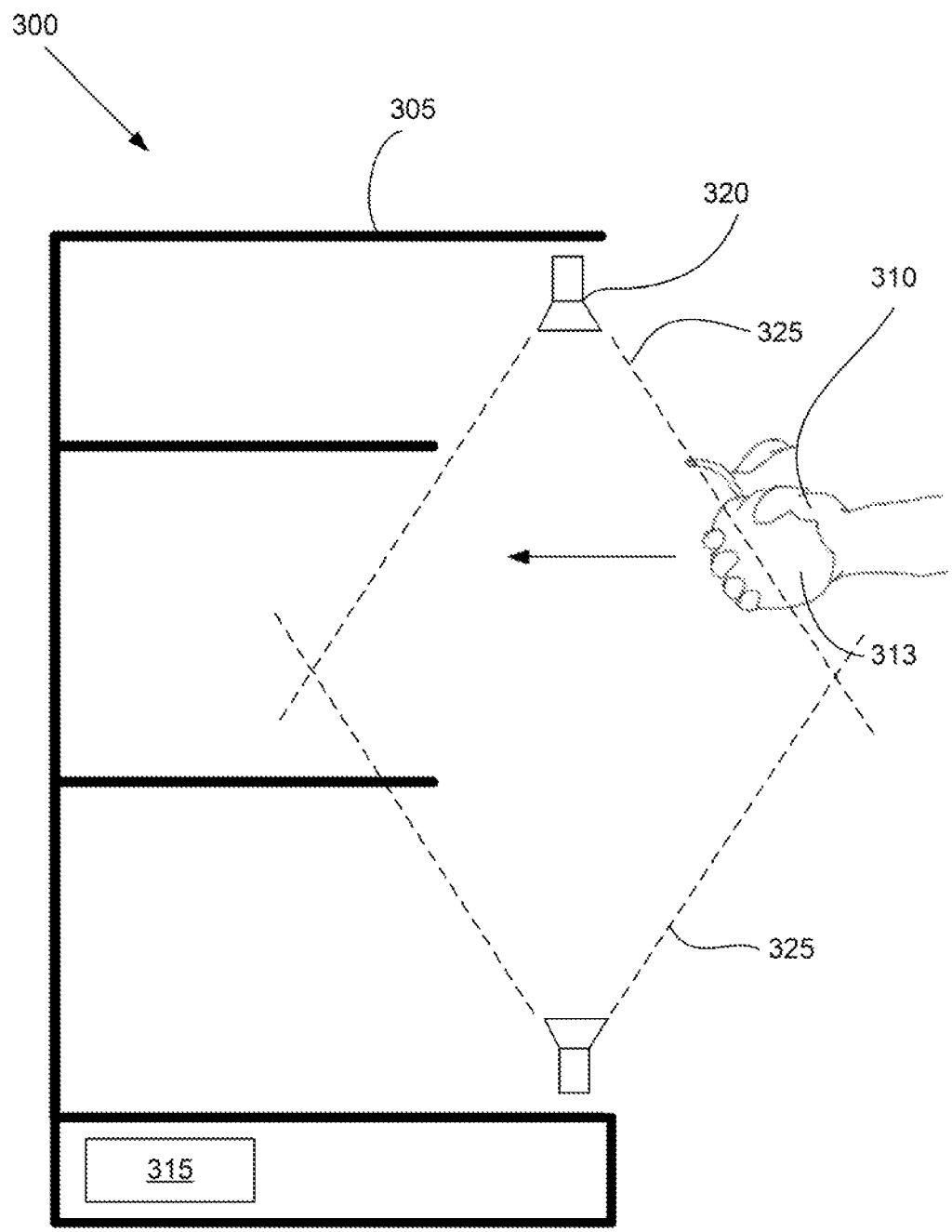
FIGS. 11A and 11B are diagrams of a carrier and an object moving in a particular direction according to one embodiment of the present invention.
Figure 11B:
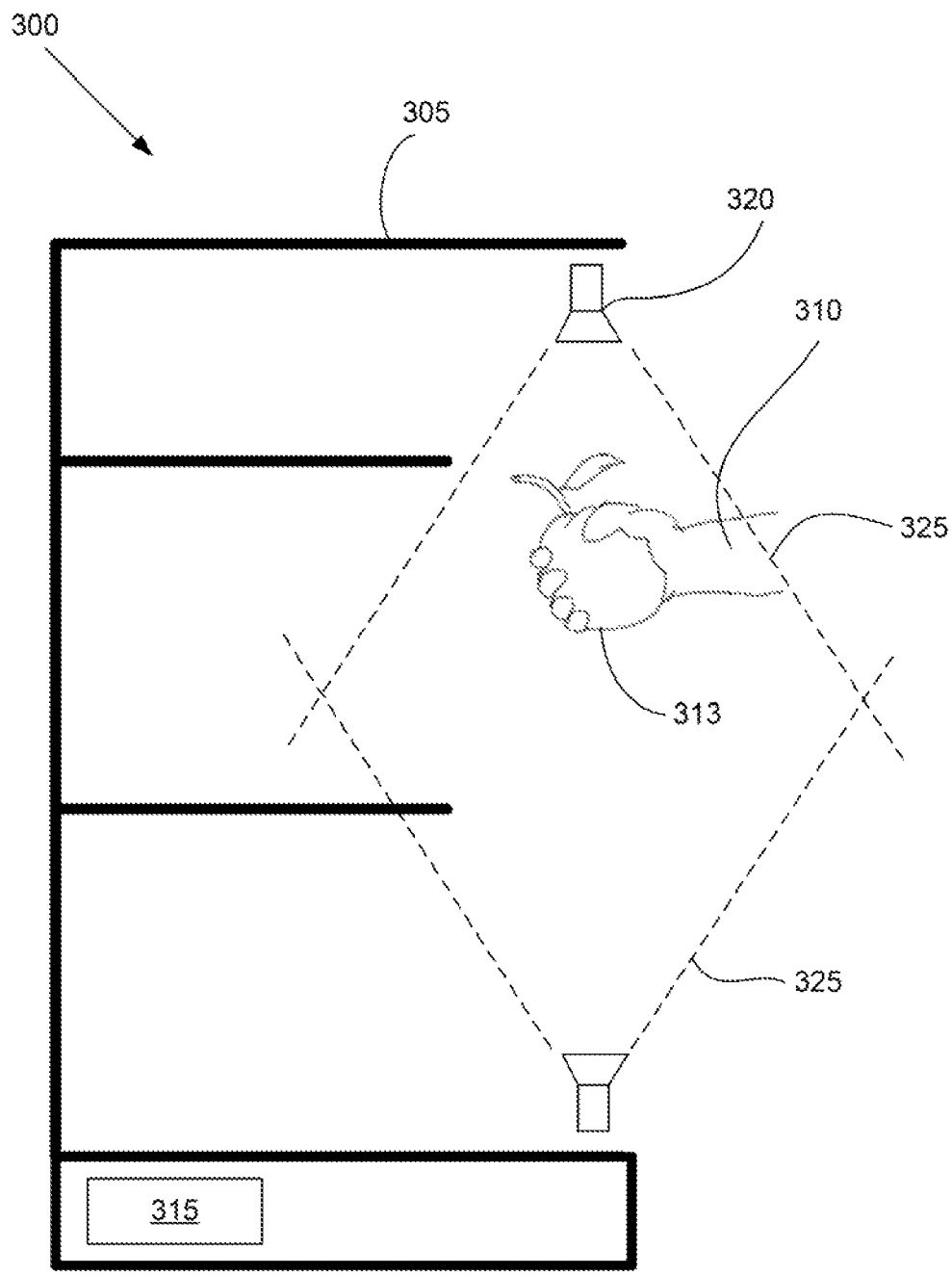

A simplified example of the above directional determination is illustrated in FIGS. 11A and 11B. FIG. 11A illustrates the storage system 300 and a carrier 310 (e.g., a hand) carrying an object 313 (e.g., an apple) at a particular time T0. The cameras capture images of the object and hand at T0. FIG. 11B illustrates the storage system 300, the carrier 310 and the object 313 at a later time T1. The carrier and object have now moved closer to the refrigerator. The cameras capture images of the object and hand at T1. The storage system and/or the storage structure obtains the images from the cameras, compares the images taken at T0 and T1, and determines, based on the comparison, that the carrier and/or object are moving towards, and not away from the storage structure 305. A somewhat similar process can be used to determine when the carrier 310 and object 313 are moving away from the storage structure 305 i.e., in a situation where FIG. 11B instead represented the position of the carrier/object at T0 and FIG. 11A represented the position of the carrier/object at T1.

Returning to FIG. 1, at step 120, the storage structure 305 identifies the object 313 based on the one or more images captured of the carrier 310 and/or the object 313 in step 110. In various embodiments, the storage structure 305 analyzes and/or processes the images to help isolate the object 313. That is, if an image includes parts of the carrier 310, the storage structure 305 and the object 313, the elements of the image that correspond to the carrier 310 and storage structure 305 may be at least partially removed to facilitate analysis of the object 313 in the image. The storage structure 305 then analyzes the processed image to determine the identity of the object 313. In the illustrated embodiment, for example, the storage structure 305 takes multiple pictures of the hand and the object 313, analyzes the object 313 in the images, and determines that the object 313 is an apple.

The above processing technique can be helpful when the cameras 320 are not able to capture a complete image of the object 313. Consider an example in which the carrier 310 and the object 313 are a hand and an apple, respectively. The hand will typically cover a portion of the apple, possibly even most of the apple. Thus, the cameras 230 only capture images that show portions of the apple that are visible outside of the portions covered by the hand (e.g., step 110). The storage structure 305 is then arranged to isolate and/or analyze the visible portions of the apple in the images, and use them to identify the apple as such (e.g., step 120).

The above processing and identification operations may be performed using any suitable technology or technique. In some approaches, for example, the storage structure 305 uses a bounding box detection algorithm to help separate the carrier 310 (e.g., the hand in FIG. 3) and the object 313 (e.g., the apple) from a background. Any known object recognition algorithm may be used to help identify the object 313. In some approaches, the storage structure 305 uses a Support Vector Machine (SVM) to identify the object 313. The SVM may be trained using, for example, a dense Scale-Invariant Feature Transform (SIFT) feature with a Bag of Words (BOW) strategy. The storage structure 305 may also use other algorithms, such as Deformable Part Descriptors (DPD) and Deep Learning (DP), to help identify the object 313.

It should be noted that the identification process may not be fruitful. In other words, the storage structure 305 may be unable to discern the identity of the object 313 based on the captured images. If this happens, a variety of steps may be taken. In some implementations, the storage structure 305 displays a message on a display panel, indicating that the identification process has an issue and prompting the user for input. The user can then input the identity of the object 313 (e.g., by typing in the word, "apple.") Alternatively, the storage structure 305 may include a microphone. After an audio or visual prompt from the storage structure 305, the user then speaks the identity of the object.

A wide variety of objects may be identified using different techniques. In some embodiments, for example, the object 313 is a collection of objects (e.g., a pile of objects, a bag of potatoes or other items, etc.) rather than a single item. The objects may be identified using any of the aforementioned algorithms, although other techniques may be used as well. For example, in some cases the item includes or displays a label, code or words, and the identification process involves scanning and reading the label, code or words. In other embodiments, the object 313 (e.g., a consumer product, a bag, etc.) includes a bar code, and the storage structure 305, a camera, sensor, scanner or other device in the storage system reads the bar code and identifies the item based on the bar code.

Afterward, at step 125, the storage structure 305 updates the inventory records database 315 based on the identity of the object 313 and the direction of the motion of the object 313. In the illustrated embodiment, for example, the storage structure 305 determines that the object 313 was moving towards the refrigerator and that the object 313 is an apple. Based on these conclusions, storage structure 305 determines that an apple has been added to the storage structure 305 and updates the inventory records database 315 accordingly.

It should be appreciated that the decision to update the inventory may be based on various other analytical steps not described above. For example, it is quite possible that a person may extend a hand with an apple towards a refrigerator but not store the apple in the refrigerator. That is, the person may withdraw the apple in the next motion. In such a situation, it would be erroneous to assume that the apple was added to the refrigerator. Thus, various implementations involve tracking multiple movements of a hand of a user towards and away from a refrigerator and determining, for each movement, whether the hand is empty or full. This information is then used to determine whether an item has truly been added to or subtracted from the refrigerator. A more detailed example of such an implementation will be described later in connection with FIG. 2.

The data in the inventory records database 315 may be arranged in a variety of ways. In some embodiments, for example, the database 315 includes a list of objects stored in the storage structure 305. Each object is associated with one or more characteristics, such as the name of the object, the time/date it was placed in the refrigerator, features of the object (e.g., is it perishable, an expiration date, etc.) or any other suitable characteristic.

When a new object is added to the storage structure 305, the storage structure 305 inputs the above information as appropriate into the database 315. When an item is removed, the database record that is associated with the object is removed. Alternatively, the object is flagged in the database 315 as removed but the associated record is kept in the database 315. The storage structure can use such records to determine consumption trends of the user i.e., how often particular items are replaced or removed from the refrigerator.

At step 130, optionally, the storage structure 305 arranges for the display of information based on the updated inventory. In some embodiments, the storage structure 305 includes or is coupled with a display panel/screen that provides information to a user based on the updated inventory. In other embodiments, the storage structure 305 transmits a message through a network to a device, which displays the information. The device may be any suitable computing device or appliance, including but not limited to a desktop computer, a laptop, a smartphone, a smartwatch, smart glasses, etc.

A wide variety of types of information may be displayed. By way of example, if an object has been added to or removed from the storage structure, the storage structure 305 may display a confirmation that the inventory records database has been updated accordingly. If the object is a perishable food, the storage structure 305 may display a reminder indicating that the food should be consumed by a deadline. A reminder may be later transmitted to the user's device and/or displayed a predetermined time before the deadline. In some embodiments, a refrigerator displays one or more recipes that can be made based on the items stored in the refrigerator. For example, if a banana was just placed in the refrigerator, the storage structure may suggest a recipe for making banana bread or a banana milkshake.

Figure 2:
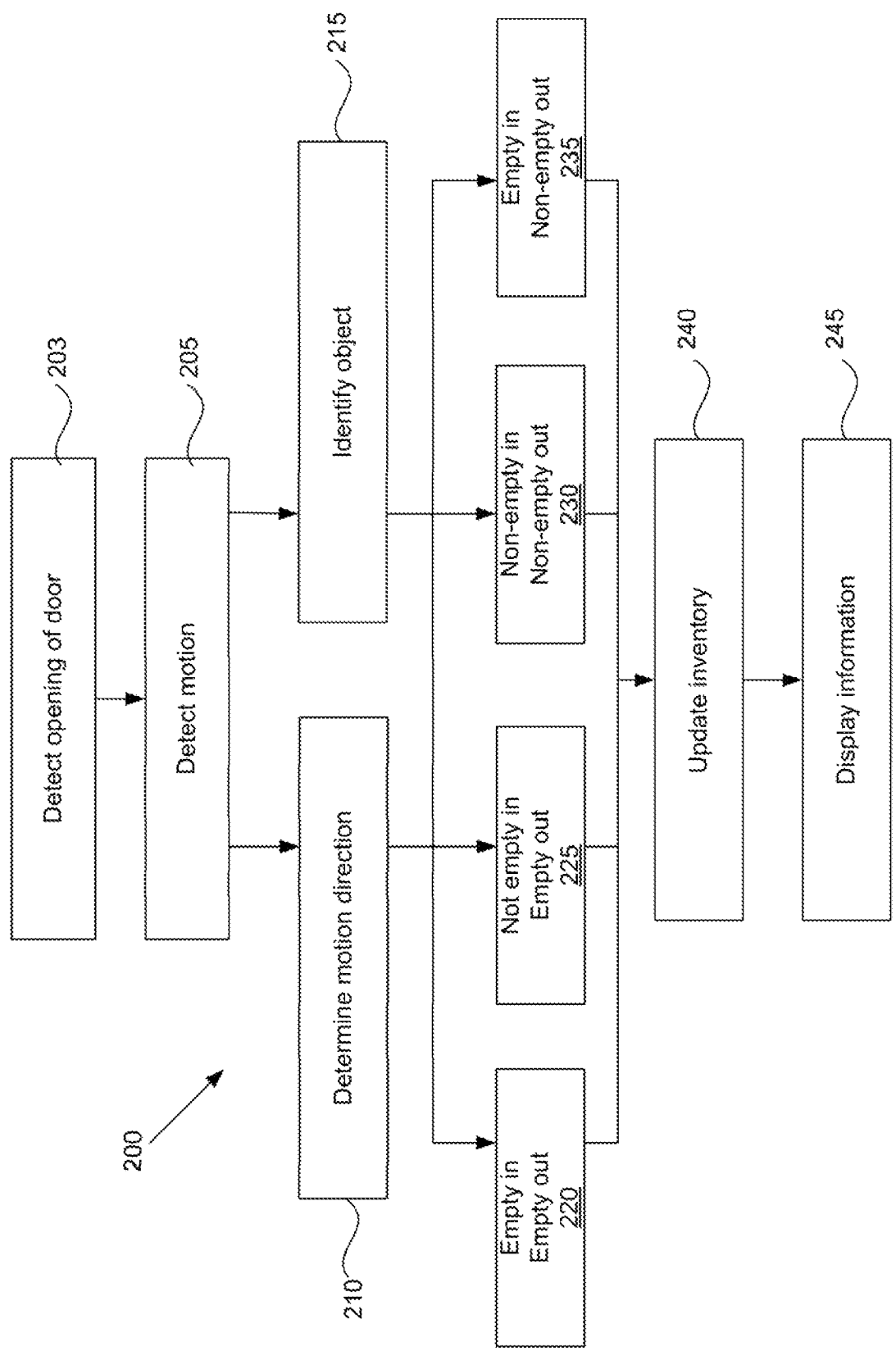
FIG. 2 is a flow diagram illustrating a method for managing an inventory system according to another embodiment of the present invention.

Referring next to FIG. 2, a method 200 for detecting motion and managing inventory according to another embodiment of the present invention will be described. The method 200 may be performed using the storage system 305 illustrated in FIG. 3. It also may be combined with any, some or all of the operations described in method 100 of FIG. 1. This exemplary method 200 includes various operations not specifically mentioned in method 100 of FIG. 1, and provides additional details regarding motion tracking and inventory adjustment.

At step 203, the storage structure 305 optionally detects the opening of the door, latch or seal to the storage structure 305. This detection step may help indicate that an object 313 will soon be removed from and/or placed in the storage structure 305. In some embodiments, the detection of the door opening triggers the activation of cameras 320 or sensors, which can be used to detect or track motion (e.g., as discussed in connection with step 110 of FIG. 1, steps 205, 210 and 215 of FIG. 2). In some embodiments, the cameras 320 are deactivated, powered down and/or are in a standby state when the door is closed. The cameras 320 are then activated when the door is opened, and deactivated again when the door is closed again. This approach can help reduce power consumption by the cameras.

At step 205, the storage structure 305 detects the motion of a carrier 310. In this example method, it assumed that the storage structure 305 is a refrigerator and the carrier 310 is the hand of a user, although the steps of this method may be applied to any suitable type of storage structure or carrier. In the illustrated embodiment, the refrigerator (e.g., storage structure 305) is arranged to detect the motion or presence of the hand at or near the entrance of the refrigerator. Any suitable motion sensing technology may be used to detect the hand.

In this example, it is assumed that user interaction with a refrigerator can often involve two basic motions. First, the hand of the user moves towards the refrigerator. Afterward, the hand of the user moves away from the refrigerator. (Hereinafter these motions are referred to as an approaching motion and a withdrawal motion, respectively.) The refrigerator in this example is arranged to track both types of motions. Any suitable technology or system may be used to track these motions (e.g., any of the cameras or sensors described in connection with step 105-110 of FIG. 1 and FIG. 3.)

The storage structure analyzes each of the above user motions at or near the entrance of the refrigerator. It then determines which direction each motion is moving (step 210) and, for each motion, whether an object 313 is being held in the hand during the motion (step 215.) If there is an object 313 being held in the hand, then the object 313 is identified (step 215). The directional determination for each motion may be performed using any operations described in connection with step 115 of FIG. 1.

The determination as to whether an object 313 is in the hand, and if so, the determination of the identity of the object 313, may be performed using any of the techniques described in connection with step 120 of FIG. 1. In some embodiments, for example, one or more cameras 315 capture images of at least parts of the hand. The storage structure then analyzes the images to determine whether the hand is holding an object 313. If the hand holds an object 313, then parts of the object 313 are likely included in at least some of the images. If it is determined that the hand is holding an object, the techniques described in connection with step 120 of FIG. 1 are used to identify the object 313.

Steps 210 and 215, which involve determining motion direction, the existence of an object held by a hand, and the identity of the object, can result in four results. That is, based on these steps, the storage structure 305 determines that the motions and actions of the user match one of the four following models:

EMPTY IN, EMPTY OUT (step 220). In this case, the storage structure 305 detects two successive motions (step 205). The storage structure 305 determines that the first motion is an approaching motion (step 210). Additionally, the storage structure 305 also determines that during that motion, the hand is empty (step 215.) The second motion is determined to be a withdrawal motion (step 210). The storage structure determines that, during the second motion, the hand is also empty (step 215).

NOT EMPTY IN, EMPTY OUT (step 225). In this case, the storage structure 305 detects two successive motions (step 205). The storage structure 305 determines that the first motion is an approaching motion (step 210). Additionally, the storage structure 305 also determines that during that motion, the hand holds an object 313 (step 215), which is identified. The second motion is determined to be a withdrawal motion (step 210). The storage structure determines that, during the second motion, the hand is empty (step 215).

NOT EMPTY IN, NOT EMPTY OUT (step 230). In this case, the storage structure detects two successive motions (step 205). The storage structure 305 determines that the first motion is an approaching motion (step 210). Additionally, the storage structure 305 also determines that during that motion, the hand holds an object 313 (step 215), which is identified. The second motion is determined to be a withdrawal motion (step 210). The storage structure determines that, during the second motion, the hand holds an object (step 215), which is identified.

EMPTY IN, NOT EMPTY OUT (step 235). In this case, the storage structure detects two successive motions (step 205). The storage structure 305 determines that the first motion is an approaching motion (step 210). Additionally, the storage structure also determines that during that motion, the hand does not hold an object (step 215). The second motion is determined to be a withdrawal motion (step 210). The storage structure 305 determines that, during the second motion, the hand holds an object 313 (step 215), which is identified.

The storage structure 305 determines which of the above four models match the motions and actions of the user. Based on this determination, the storage structure 305 then updates the inventory records database 315 (step 240). The manner in which the database 315 is adjusted depends on the selected model:

EMPTY IN, NOT EMPTY OUT: This means that the user has reached into the refrigerator and taken out the identified object. Thus, the storage structure 305 updates the inventory records database 315 to indicate that the identified object has been removed from the storage structure 305.

NOT EMPTY IN, EMPTY OUT: This means that the user has placed the identified object into the refrigerator and withdrawn an empty hand. Thus, the storage structure 305 updates the inventory records database to indicate that the identified object has been added to the storage structure 305.

EMPTY IN, EMPTY OUT: This means that the user has extended an empty hand towards the refrigerator and has drawn an empty hand out of the refrigerator. Thus, the storage structure does not alter the inventory records database, since the inventory has not changed. Alternatively, the storage structure 305 updates the inventory records database 315 to include a record indicating that the actions took place at a particular time and/or that the inventory has not changed.

NOT EMPTY IN, NOT EMPTY OUT: This means that the hand of the user went into the refrigerator while holding a first identified object. Afterward, the hand of the user pulled back from the refrigerator holding a second identified object. In this situation, the storage structure determines whether the first and second objects are the same. If they are, it is assumed that the inventory has not changed and/or the inventory records database is updated to record the actions.

If the first and second objects are identified (step 215) and found to be different, then this means that the user placed the first object into the refrigerator and took out a different, second object out of the refrigerator. The storage structure 305 then updates the inventory records database 315 accordingly (i.e., to indicate the removal of the second object from the stored inventory and the addition of the first object to the inventory.)

Afterward, the storage structure 305 optionally displays information based on the updated inventory (step 245). This step may be performed using any of the features described in connection with step 130 of FIG. 1.

An advantage of some embodiments of the methods 100 and 200 of FIGS. 1 and 2 is that an object can be analyzed without requiring that the object be held still for a period of time. That is, an object is identified and a direction of a motion of the object is determined (e.g., steps 105-125 of FIG. 1 and/or 205-240 of FIG. 2) without requiring that a user/carrier stop moving the object until the carrier actually leaves the object inside the storage structure. In other words, from the time the motion of the carrier/object is initially detected until the time the object is deposited into the storage structure 305, the carrier and/or object can be in continuous motion. In other embodiments, however, the carrier 310 or the user may hold the object still to facilitate the above determinations.

Figure 4:
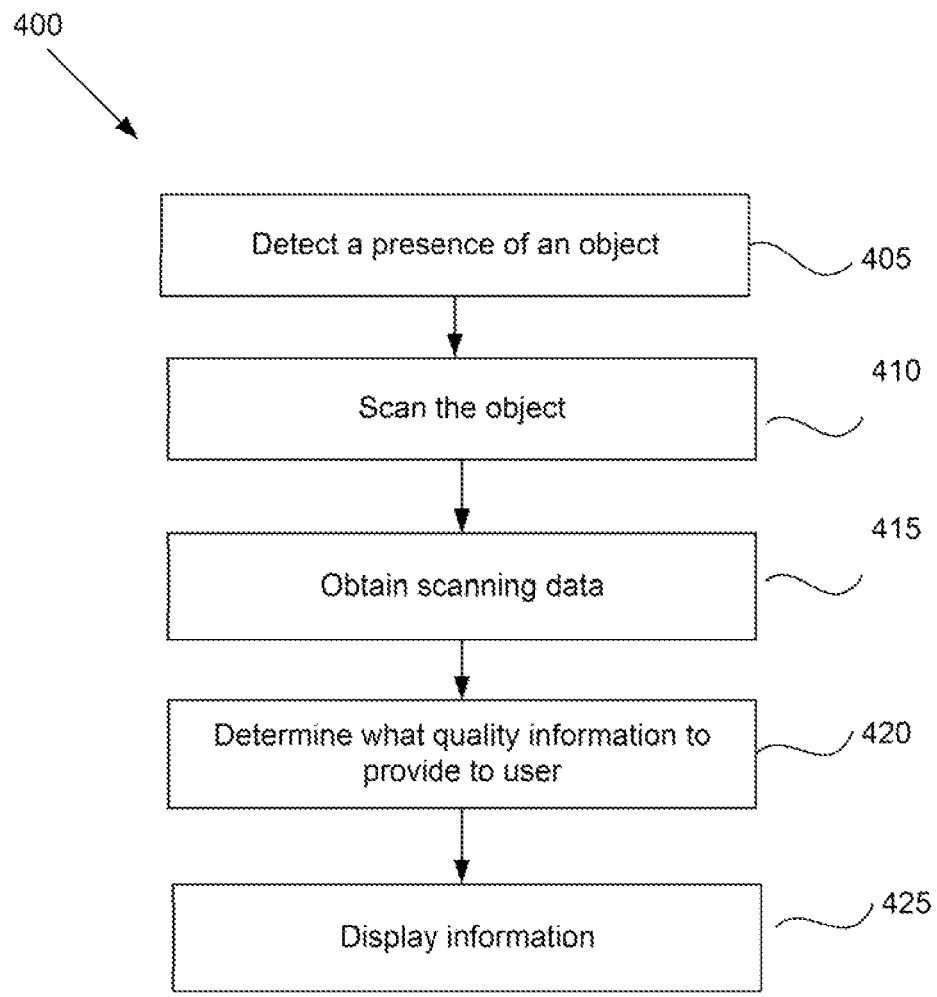
FIG. 4 is a flow diagram illustrating a method for scanning an object according to a particular embodiment of the present invention.
Figure 5A:
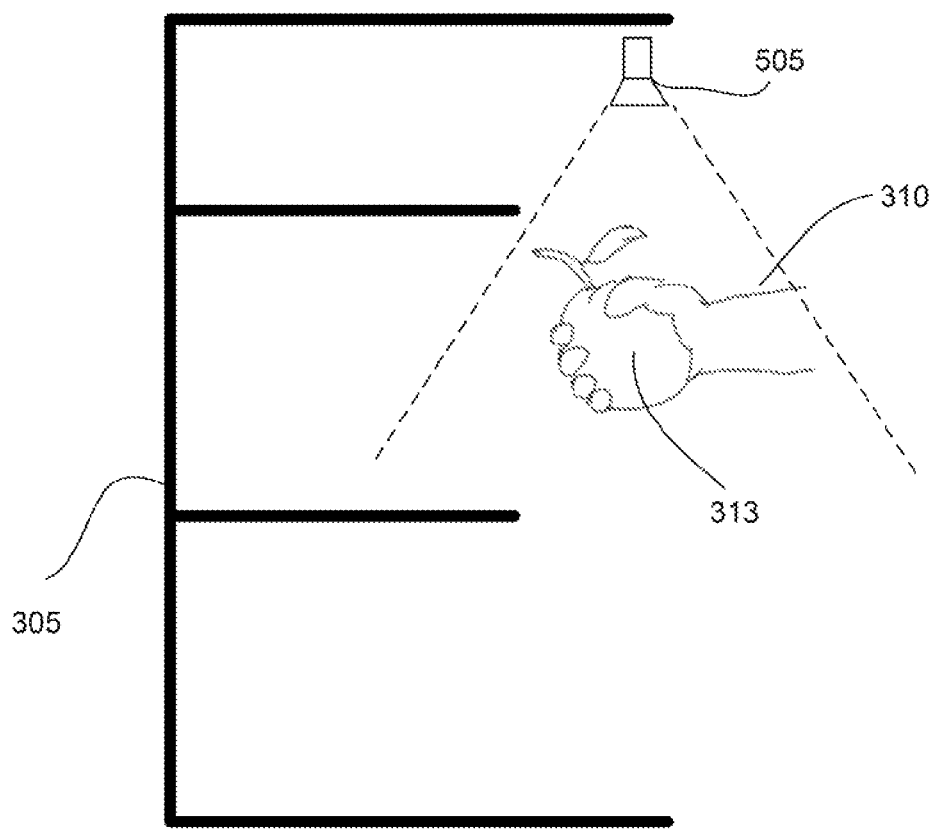
FIGS. 5A and 5B are diagrams of storage structures with scanners according to various embodiments of the present invention.

Referring next to FIGS. 4 and 5A, an example method 400 for scanning an object and providing information based on the scan will be described. In the illustrated embodiment, the method 400 is implemented using the storage structure 305 illustrated in FIG. 5A, which is the same as the storage structure 305 illustrated in FIG. 3. That is, in various embodiments, storage structure 305 of FIG. 5A includes any or all of the features/components illustrated in FIG. 3, even if such features/components are not specifically shown in FIG. 5A. Additionally, any, some or all of the steps of the method 400 may be performed during, after or before any of the steps in the method 100 of FIG. 1.

In FIG. 5A, the storage structure 305 includes a scanner 505. A carrier 310 (e.g., a hand of person) is holding an object 313 (e.g., an apple) that is positioned near the scanner 505. In this particular example, the storage structure 305 is a refrigerator and the scanner 505 is positioned on, near and/or within the refrigerator, although this is not a requirement and, as previously discussed, the storage structure 305 may be any suitable structure for holding items.

Initially, at step 405, the storage structure 305 detects a presence of an object 313. In the illustrated embodiment, for example, a carrier 310 (e.g., a hand of a user) positions an object 313 (e.g., an apple) in the vicinity of the scanner 505. The storage structure 305 and/or the scanner 505 detect the object 313 as it comes into range of the scanner 505. Any suitable technology or device in, on or near the storage structure 305 may be used to detect the object e.g., a proximity sensor, an image sensor, a light sensor, a camera, etc. The detection of the presence of the object may occur at the same time as and/or use any of the same hardware or techniques as in step 105 of FIG. 1.

At step 410, in response to the detection of the object 313, the scanner 505 scans the object 313. The scanner 505 may use any suitable scanning technology. In the illustrated embodiment, for example, the scanner 505 is a near infrared (NIR) scanner. Some scanner implementations project light of a particular wavelength (e.g., 750 nm to 2500 nm) towards the object 313. The scanner 505 includes a receiver that receives and analyzes the reflected light. The reflected light can reveal information regarding the molecular structure of the object 313. Any known chemometric and/or NIR spectroscopy method may be used to scan and analyze the object 313.

The storage structure 305 may display messages or provide audio cues to indicate when the scan is completed. In some embodiments, for example, a carrier 310 or user may need to hold the object 313 in front of the scanner 505 for at least a predetermined period of time for the scan to complete successfully. When the scan is successfully completed, the storage structure 305 may display a message to that effect. Alternatively or additionally, the storage structure 305 may emit an associated audio cue (e.g., speech, a tone, a bell, etc.) to indicate that the scan has been successfully completed. In other embodiments, there is no need for the carrier 310 to hold the object 313 in a fixed position for scanning. That is, the scanning takes place and is completed while the carrier 310 is in motion and while the carrier 310 is moving the object 313 to or from its resting place in the storage structure 305.

At step 415, the storage structure 305 obtains scanning data from the scanning process performed in step 310. The data is processed to obtain useful information about characteristics of the object (e.g., its quality, features, condition, etc.). In some embodiments, the data is processed by the storage structure 305 itself. In other embodiments, the storage structure 305 transmits the scanning data to a remote device (e.g., a cloud-based server) for processing. The external device then transmits information (e.g., quality information regarding the object) back to the storage structure 305.

The processing of the scanning data may be performed using any suitable technique. In some embodiments, for example, a recognition engine (e.g., in a remote device/server or at the storage structure 305) obtains selected features (e.g., data related to desired areas of interest, such as sugar content, calories, ripeness etc.) from the scanning data. The features are inputted into a statistical model, which generates desired quality information (e.g. a measurement of the sugar content, calories, ripeness level, etc.)

The scanning and analysis operations described above can generate a wide variety of different types of quality information regarding the object. In some embodiments, for example, information relating to food quality (e.g., bacteria detection, ripeness, expected expiration date, etc.) and/or food type (e.g., identifying an object as a fruit, vegetable, wine, oil, corn, meat, fermented food, etc.) may be obtained. If the object is not a food, then information regarding its condition or composition may be obtained (e.g., materials used to make the object, extent of damage done to the object, etc.)

At step 420, the storage structure determines what quality/characteristic information is displayed to a user, provided to an application or otherwise revealed. As will be discussed in greater detail later in this application, this may vary depending on the identity of the object (e.g., as determined in step 120 of FIG. 1, step 215 of FIG. 2 and/or as determined using the scanning process itself, as described above.) Different features of an object, depending on what the object is, may be of interest. For example, if the object is a fruit, sugar content and/or ripeness information may be desired. If the object is a piece of meat, freshness information may be desired. Additional examples of this approach are provided later in this application in connection with FIGS. 6A-6C.

Afterward, the storage structure 305 displays the determined quality/characteristic information (step 425). By way of example, such information may be displayed on a display screen coupled with the storage structure 305. Additionally or alternatively, the storage structure 305 may transmit the quality/characteristic information to an external device (e.g., a smartwatch, cell phone, smartglasses, computer, laptop, etc.) for viewing by a user.

The types of quality information that are obtained or displayed may vary widely, depending on the nature of the storage structure 305. If the storage structure 305 is a refrigerator, for example, the quality information may relate to food quality, freshness and nutrition (e.g., calories, ripeness, vitamin and mineral content, fat and fiber levels, etc.). If the storage structure 305 is a cabinet or shelf for storing non-food items, then the quality information may relate to the quality of construction of the object, which may be a product or device of some kind.

For instance, consider an example of a cabinet for storing electronic products that includes a scanner 505 as described above in connection with method 400. A user then positions a damaged cell phone near the scanner. Based on a scan of the cell phone, a display panel coupled with the cabinet then generates information indicating the severity of the crack or damage in the phone.

It should be appreciated that in some embodiments, the storage structure 305 may also provide additional recommendations or service offerings that are based on the determined quality information. In the above example, for instance, the storage structure 305 may recommend places where the phone can be repaired or a possible resale price for the phone that takes into account the determined damage done to the phone. If a food is found to have a particular level of freshness, the storage structure 305 may display recommended recipes suitable for that level of freshness. By way of example, if a food object is identified as beef or fish and it is scanned to determine that its level of freshness exceeds a predefined threshold, a recipe involving only slightly cooking the beef (e.g., to medium rare) or eating the fish raw is recommended. In another example, if the food object is spinach and it is scanned to determine that its freshness level exceeds a predefined threshold, then a spinach salad is recommended. Otherwise, for more wilted spinach, spinach soup is recommended.

The storage structure is capable of providing a wide variety of useful recommendations particularly when a storage structure is capable of performing both the method 100 of FIG. 1 and the method 400 of FIG. 4. In various embodiments, such a storage structure thus includes one or more cameras as well as a scanner.

Consider the following example that involves a storage structure 305 with the above capabilities. In this example, a carrier 310 (e.g., in this case, a user) places an object into the storage structure 305 (e.g., a refrigerator.) This motion is detected (e.g., step 105 of FIG. 1 and/or step 205 of FIG. 2), one or more images are captured of the object 313 or the user (e.g., step 110 of FIG. 1) and the motion direction is determined (e.g., step 115 of FIG. 1 and/or step 210 of FIG. 2). The object is identified (e.g., step 120 of FIG. 1 and/or step 215 of FIG. 2). Then, the user positions the object 313 in front of a scanner 505 that is coupled with the storage structure 305. The object 313 is detected and scanned, and scanning data is obtained (e.g., as described in steps 405-415 of FIG. 4.) It should be noted that the steps 405, 410 and/or 415 may also be implemented at substantially the same time as steps 105-120 of FIG. 1 and steps 205-235 of FIG. 2.

In this example, after the identity and scanning determinations are made, the storage structure 305 provides recommendations to a user based on both determinations. That is, the information that is displayed to the user differs, depending on the identity of the object (e.g., as determined in steps 120 of FIG. 1 and 215 of FIG. 2) and the quality/features of the object (e.g., as determined in step 410, 415 and 420 of FIG. 4.) FIGS. 6A-6C are charts that indicate examples of this approach. The Y axis of each chart represents possible quality features/information determined using the aforementioned scanning process. The X axis of each chart represents possible identities of the object 313 (e.g., as determined in step 120 of FIG. 1 and/or step 215 of FIG. 2.) It should be appreciated that the charts only represent a few example implementations, and other implementations may depart from what is shown in the figures.

In FIG. 6A, the chart 601 indicates that the displayed information differs depending on whether the object 313 is identified as a fruit. If it is determined that the object is a fruit, sugar content information is displayed based on the obtained scanning data (result 605). If the object 313 is not a fruit, then sugar content information is not displayed but possibly other nutritional information may be displayed based on the scanning data, such as fiber, fat or caloric content (result 610). This is based on the assumption that users might be particularly interested in the sugar level in fruits, which may indicate their ripeness or sweetness, but less interested in sugar content information if the object is not a fruit (e.g., is instead a piece of meat or grain.)

In FIG. 6B, the chart 603 indicates that the displayed information varies depending on whether the food object is identified as a fermented food (such as yogurt or kimchee) and further depending on whether the scan indicates that bacteria is detected. Result 615 indicates that when the food is fermented and bacteria exists, then a bacteria count is shown. This is because users might be interested in knowing the bacteria count of a fermented food, as a high count may indicate greater health benefits. However, if the food is not fermented, and bacteria is detected, a warning is displayed, since this may indicate that the food is spoiled (result 620). If the object is identified as a fermented food and no bacteria is found using the scan, then a different warning is displayed, indicating that the fermented food contains no healthy bacteria (result 625). Lastly, if the object is identified not to be a fermented food and no bacteria is detected, information is displayed indicating that no bacteria was found and that the food seems fresh, hygienic and/or safe to eat (result 630).

In FIG. 6C, the chart 606 indicates that the displayed information varies depending on whether the food object is in a particular state or condition. FIG. 6C relates to a particular example in which the displayed information varies based on whether the food object is identified as being a type of food that is edible when overripe (e.g., a banana) and further depending on whether the scan indicates that the food object is overripe i.e., has a degree or level of ripeness that exceeds a predetermined threshold. Result 635 indicates that if the object 313 is of the above food type (e.g., a banana) and is also overripe, then a recommendation to try a recipe that takes advantage of the ripeness (e.g., a banana bread recipe) is displayed. As indicated in result 640, if the food object is of the above food type and it is not overripe, then a different message is displayed (e.g., nutritional information about the food object, an indication that the banana is good for eating on its own without further preparation or cooking, a recipe that uses non-overripe bananas, such as a banana split, etc.) If the food object is not of the above type and it is determined to be overripe, then a warning message is displayed indicating that the food object may be overly ripe (result 645). If the food object is not of the above type and it is not overripe, then a message is displayed indicating nutritional or other information about the food e.g., calorie count, a message indicating that the food is fairly fresh and/or not overly ripe, etc. (step 650.)

Another approach involves an expiration date recommendation depending on different types of food. For example, if the food object is cheese, then an estimated expiration date can be given based on the bacteria level and/or certain chemical materials. Another possible application involves a recipe recommendation based on known raw food materials in the fridge and the freshness of them. For example, if a piece of salmon is scanned, the recommendation system may suggest making oven roasted salmon with asparagus. This suggestion is based on the fact that the user has both salmon and asparagus in the fridge, and the asparagus is almost past its expiration date.

A wide variety of other types of information may also be displayed at the storage structure 305 based on a combination of inventory data (e.g., obtained using methods 100 and 200 of FIGS. 1 and 2) and quality information (e.g., obtained using method 400 of FIG. 4.) Consider an example in which the storage structure 305 is a refrigerator that records the identity of foods that are taken out (consumed) by a user and put in by the user and the time/date associated with those actions. Additionally, each food that is placed in the refrigerator is scanned, so the calorie content of each food object is known and recorded in the inventory records database 315 in association with the identity of the food object. Additionally, the vitamin/mineral content or nutritional statistics related to each food object is determined through the scanning process and this data is also associated with the identity of the food object and stored in the database.

Thus, by analyzing the above information, the storage structure 305 can estimate the calories consumed by a particular user and the nutritional content of that consumption. In some embodiments, based on the analysis, the storage structure 305 provides various types of information. By way of example, the storage structure 305 displays or communicates information indicating how many calories the user has consumed in his or her last meal or during a particular time period (e.g., each day, week or month.) Alternatively, the storage structure 305 displays or communicates information indicating that too much of a particular food is being eaten (e.g., beer, potato chips, etc.) In some implementations, the storage structure 305 displays statistics indicating vitamins and minerals that the user has been consuming, and makes recommendations regarding recipes or foods that would address vitamin or mineral deficiencies in that consumption. By way of example, based on the above analysis, the storage structure 305 may determine that the user is consuming too little omega 3 on a weekly basis, and so may display a message indicating this problem and/or suggesting consumption of more oily fish or omega 3 supplements.

Figure 5B:
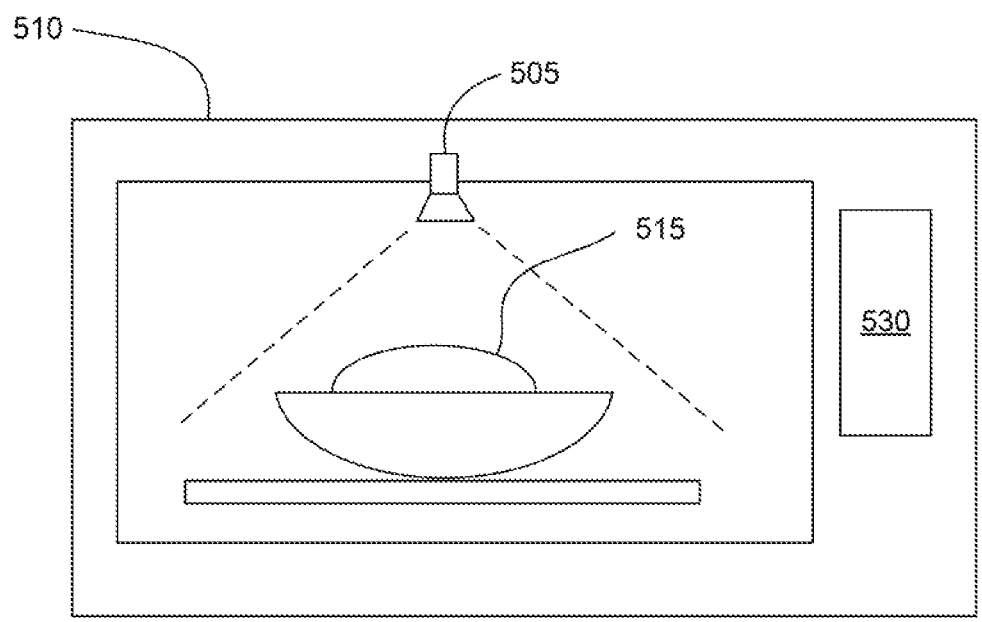

Many of the above examples refer to a scanner 505 that is coupled with a refrigerator, but this is not a requirement and the scanner 505 may be positioned in or coupled with any suitable storage structure. FIG. 5B is a diagram illustrating a storage structure 510 that is a microwave oven or conventional oven. The storage structure 510 includes a scanner 505 and a display panel 530. In this example embodiment, the scanner is positioned in an interior compartment of the microwave where cooking takes place.

An example usage of the oven may be described as follows. A user places a food object 515 in the oven. The oven detects the presence of the object 515 (step 405 of FIG. 4). The scanner 505 in the oven scans the object (step 410). Scanning data is obtained (step 415). In some embodiments, the oven is also arranged to identify the object 515 (e.g., using any of the techniques described in connection with steps 110 and 120 of FIG. 1) The oven determines quality information about the object 515 for a user (step 420) based on the scan and/or the identification of the object (e.g., as discussed in connection with FIGS. 6A-6C.) In some embodiments, the oven, in response to user input, then heats and cooks the food object. Optionally, the above detecting, scanning, identification and/or quality information determination steps are repeated after the cooking is complete. Thus, the oven can obtain quality information indicating the effects of the cooking on the food object and/or compare them to the quality information obtained prior to cooking. By way of example, based on such quality information, the display panel 530 of the oven may display various messages e.g., the food is well cooked, the food is undercooked, the food should be cooked longer at a particular temperature for a particular time period, nutritional information about the food, etc.

Figure 7:
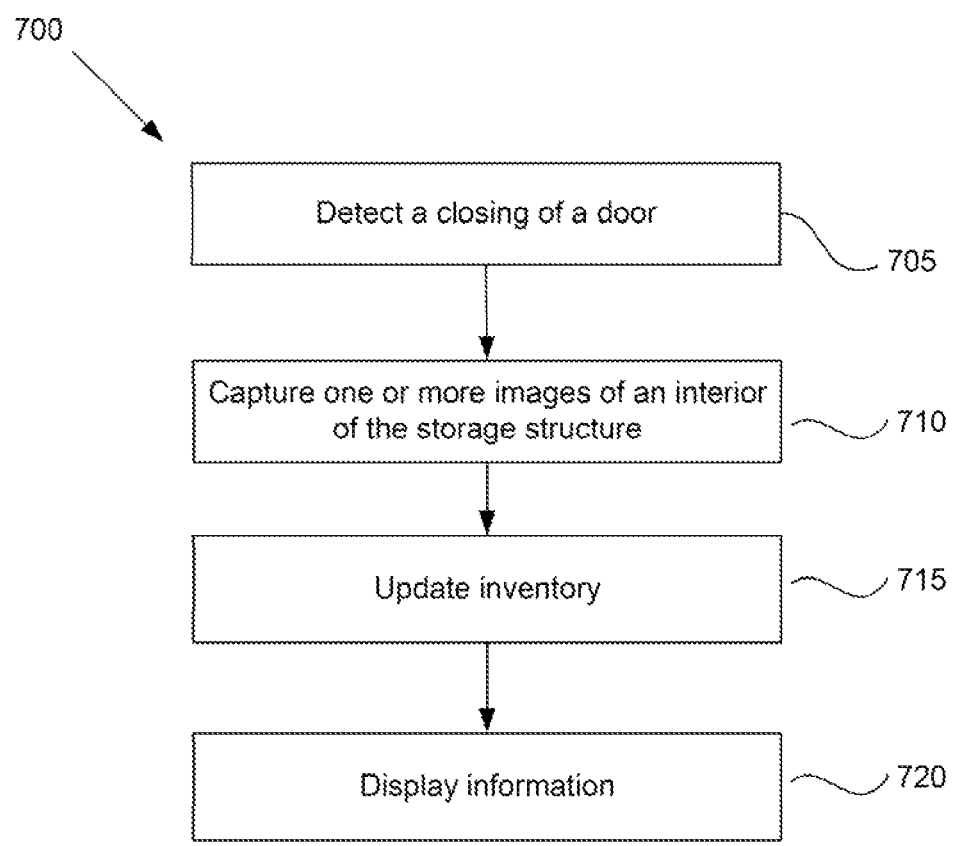
FIG. 7 is a flow diagram illustrating a method for determining inventory at a storage structure according to a particular embodiment of the present invention.
Figure 8:
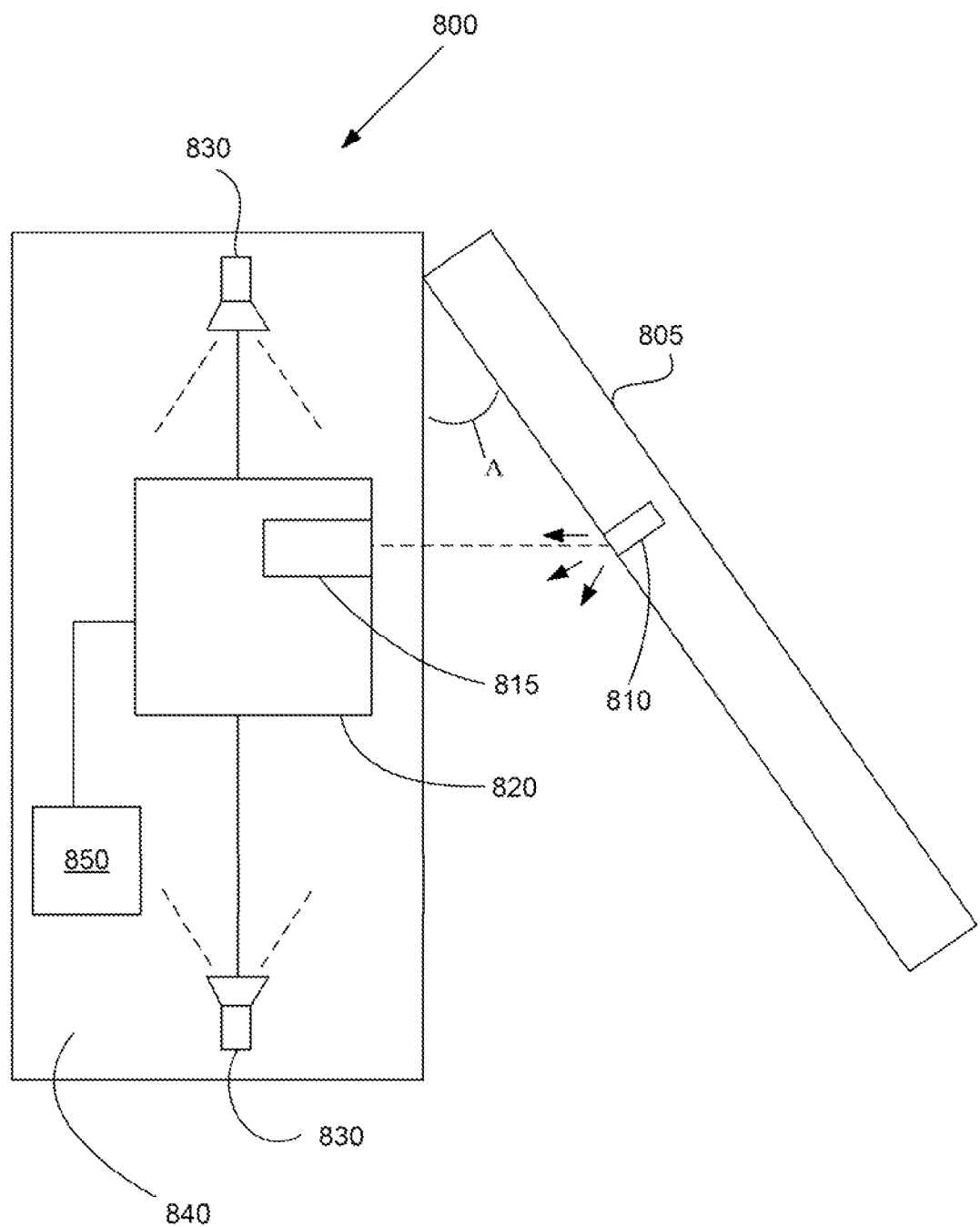
FIG. 8 is a block diagram of an example storage structure configured to implement the method illustrated in FIG. 7.

Referring next to FIG. 7, an example method 700 for tracking inventory in a storage structure will be described. Generally, the method 700 involves a technique for capturing images of an interior of a storage structure 800 (e.g., a refrigerator) to determine its inventory. This method 700 may be performed using the storage structure 800 illustrated in FIG. 8. The storage structure 800 includes a door 805, a light transmitter 810, a light receiver 815, a controller 820, one or more cameras 830 and an inventory records database 850. The storage structure may also include any of the features and perform any of the operations described in connection with FIGS. 1-6C.

Initially, at step 705, the storage structure 800 detects a closing of the door 805. The closing of the door may be detected in a wide variety of ways. In some embodiments, for example, the light transmitter 810 is positioned on the door 805 in such a way that it transmits light towards the interior of the storage structure 800. There is also a light receiver 815 positioned on the base 840 of the storage structure 800. (In some embodiments, the positions of the light transmitter 810 and receiver 815 are reversed i.e., the transmitter is on the door and the receiver is on the base.) As the door 805 is opened or closed, the amount of light received by the receiver 815 from the light transmitter 810 changes. That is, the amount of light received by the receiver 815 varies based on the angle A of the door 805 relative to the base 840 (or other selected surface) of the storage structure 800. It should be appreciated that any technology or sensor may be used to detect the closing of the door 805 and/or angle A. In other embodiments, proximity-based, potentiometer-based or software controlled sensors are used.

When the amount of light received by the receiver 815 or the angle A reaches a particular threshold and/or range, the receiver 815 sends a signal to the controller 820. The controller 820 then triggers the activation of the one or more cameras 830, which capture one or more images of the interior of the storage structure (step 710). In various implementations, the cameras 830 are positioned on the door so that at the time of trigger, they have an expansive, clear view of the contents of the storage structure 800. That is, the cameras 830 capture images of multiple locations (e.g., fruit/produce compartment, top shelf, middle shelf, lower shelf, egg container, etc.) in the interior of the storage structure 800 as well as any objects that are in those locations.

Once the image(s) of the contents of the storage structure 800 are captured, the storage structure 800 analyzes the images and identifies one or more objects in them (step 320). This may be performed in a wide variety of ways. In some embodiments, the storage structure 800 first corrects distortions in the images and then identifies individual objects in the images. Additionally, various implementations involve determining a relative location of each object in the storage structure based on the images. This location and identity information may be stored in the inventory records database 850. (The inventory records database 850 may be similar to or the same as the database 315 of FIG. 3.) By way of example, in some approaches, the information is stored in the form of a graph that indicates location, temporal and identity information for each object in the storage structure 800.

It should be noted that in various embodiments, the above image capture and analysis operations are repeated over time e.g., every time that the door 805 of the storage structure 800 is closed. Thus, the storage structure 800 and/or the database 850 may store historical information indicating the disappearance and appearance of objects in the refrigerator. Based on this historical information, the storage structure 800 can sometimes determine the identity of a particular object, even if the object is partially blocked from the view of a camera by another object. For example, consider an example where the historical information indicates that milk is always placed in a particular location and is often replaced. Based on steps 705 and 710 of method 700, the storage structure 800 determines that a new object has been placed in that same location and cannot be clearly seen in the captured images (e.g., steps 710 and 715). The storage structure 800 then determines that the new object is milk based on the historical information.

At step 715, the storage structure 800 updates the inventory records database 850 to reflect any changes made to the inventory of the storage structure. The update is based on the images and the detection of any changes in the objects identified in the images (e.g., steps 710 and 715). To use a simple example, images captured in the past (e.g., step 710) may indicate that a milk carton and three juice bottles were in a shelf on the door of a refrigerator. Later, images are again captured (e.g., step 710) indicating that at that location, the milk carton is missing and the three juice bottles are still on the shelf. Based on the difference between the images, the storage structure 800 updates the inventory database 850 to indicate that the storage structure no longer contains the milk carton.

At step 720, the storage structure displays information on a display panel based on the aforementioned update and/or the inventory data stored in the database 850. Additionally or alternatively, the information is transmitted from the storage structure 800 to an external device (e.g., a smartphone, smart glasses, a smart watch, a laptop or desktop computer, etc.) and displayed therein.

A wide variety of different types of information may be displayed. In some embodiments, at least a portion of an image captured in step 710 is displayed. Consider an example in which a user has recently placed an orange in a refrigerator (e.g., storage structure 800). The refrigerator captures an image of multiple objects in the refrigerator, including the newly placed orange. The refrigerator compares the new image with an image taken at an earlier time, and determines that the orange was just added. The refrigerator then displays a portion of the image (e.g., just a portion that shows the orange without showing the other objects in the image.) Additionally, a suitable message may also be shown ("You added an orange to your refrigerator. Inventory has been updated.") Any of the display operations described in connection with steps 130 of FIG. 1 and step 245 of FIG. 2 may also be performed at this step.

Figure 9:
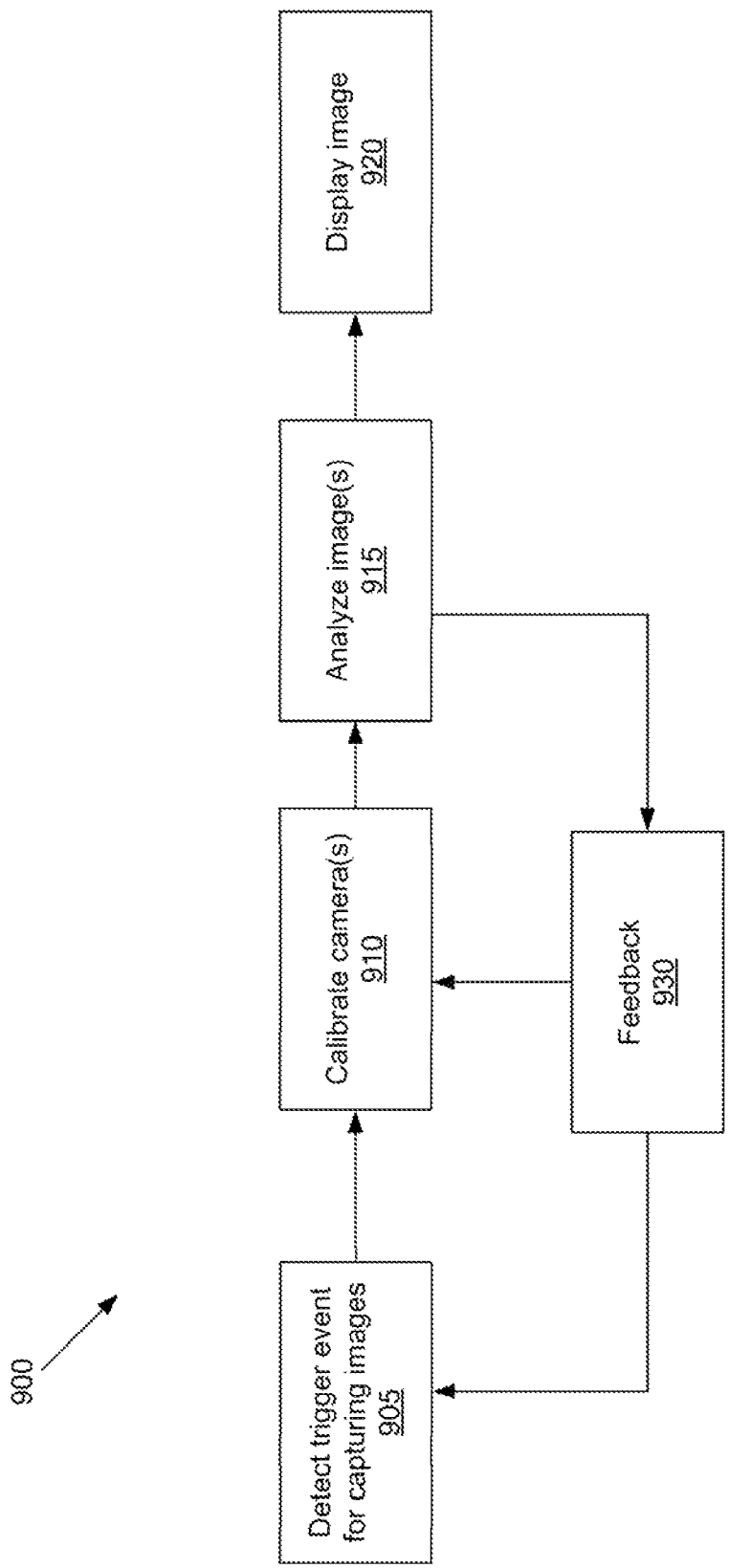
FIG. 9 is a flow diagram illustrating a method for calibrating a camera using feedback according to a particular embodiment of the present invention.

Sometimes a camera 830 in the storage structure 800 may provide suboptimal images, which could be improved if the control parameters for the camera 830 were adjusted. Referring next to FIG. 9, a flow diagram illustrating a method 900 for adjusting control parameters for a camera 830 will be described. The method 900 of FIG. 9 may be performed generally at the same time and/or in conjunction with the method 700 of FIG. 7. At step 905, the support structure 800 detects a trigger event (e.g., a closing of the door) that causes the capturing of an image by the camera 830. Step 905 may be performed generally the same as or similar to step 705 of FIG. 7.

At step 910 of FIG. 9, the support structure 800 calibrates control parameters for the camera 830. Any suitable control parameter may be calibrated, including but not limited to exposure, autofocus (on/off) and frame rate. At step 915, the storage structure 800 analyzes the captured image to determine if it is of sufficient quality. The quality may be deficient in a variety of ways. For example, the image may not cover a sufficient range of objects/locations in the storage structure 800. The image may be overexposed or may require autofocus. In some cases, the image is suboptimal because the image should be captured when the door 805 has reached a different angle (as discussed in connection with step 705 of FIG. 7 and FIG. 8.)

If the quality is deficient, feedback is provided to steps 905 and 910. That is, as appropriate, the triggering event (e.g., door angle threshold) of step 905 is adjusted and/or one or more other camera control parameters (step 910) are altered. Thus, in the future, the camera 830 will capture images using the adjusted parameters and settings. Once a suitable image has been generated by the camera, it is optionally displayed at step 920 (e.g., as discussed in connection with step 725 of FIG. 7.)

A variety of conditions or factors may trigger the adjustment of camera control parameters. By way of example, in some embodiments, the storage system, the storage structure 800, the camera 830 and/or a sensor detects the ambient light levels. Based on the detected ambient light levels, the camera control parameters are then adjusted. This can help improve the quality of images captured using the camera.

Figure 10:
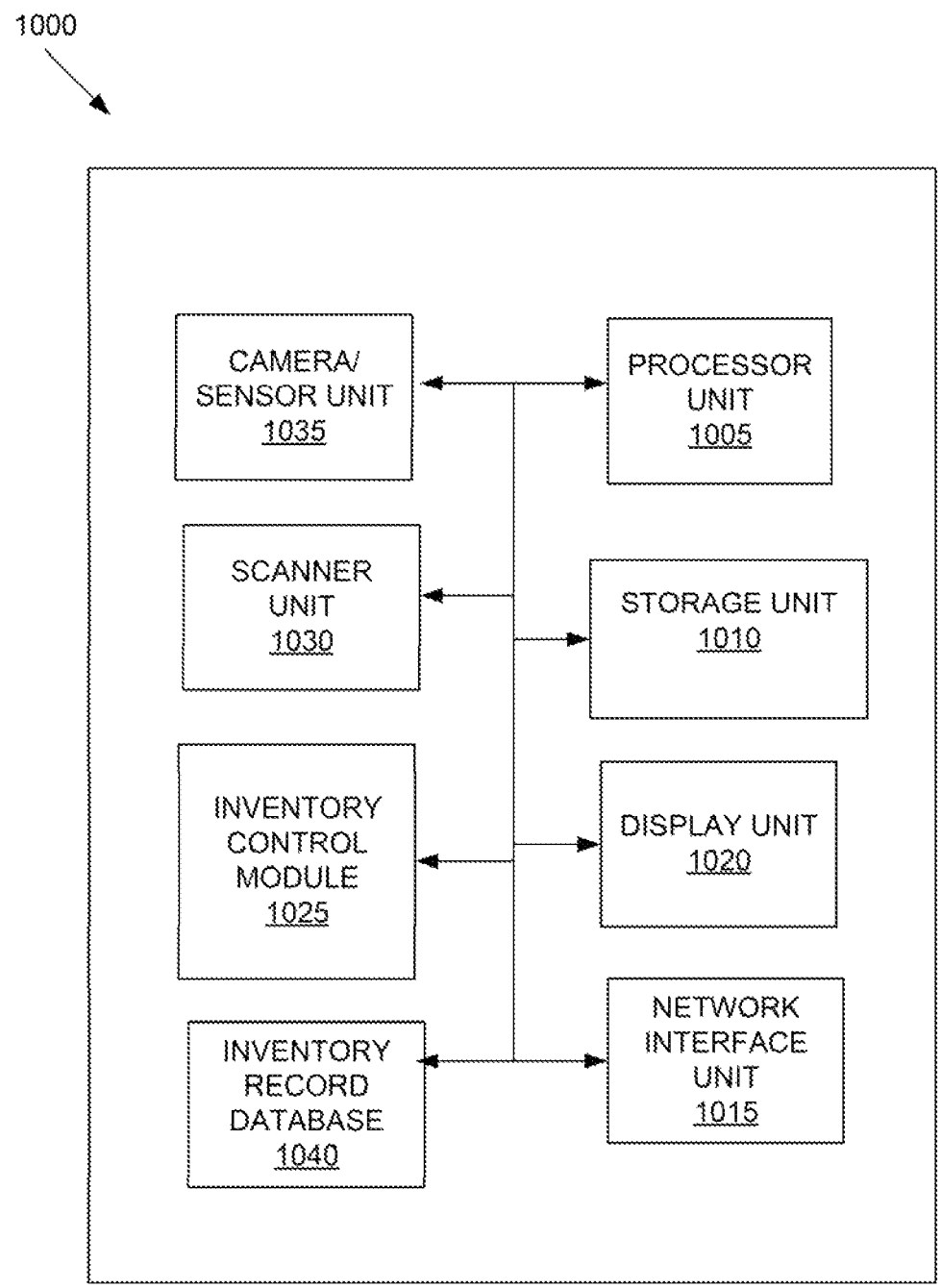
FIG. 10 is a storage structure according to a particular embodiment of the present invention.

Referring next to FIG. 10, a storage structure 1000 according to a particular embodiment of the present invention will be described. The storage structure 1000, which may be any of the storage structures (e.g., storage structures 305/800 of FIGS. 3, 5A and 8) described in this application, includes a processor unit 1005 including one or more processors, a storage unit 1010, a display unit 1020, a network interface unit 1015, a camera unit 1035, a scanner unit 1030, an inventory control module 1025 and an inventory record database 1040. The storage structure 1000 may also include any of the devices and features described in connection with FIGS. 3, 5A, 5B and FIG. 8 e.g., multiple interior shelves and compartments, a display screen, a door, one or more cameras or motion tracking sensors, a light transmitter, a light receiver, a scanner, etc. The storage structure 1000 may be any structure or device that is arranged to hold objects, including but not limited to a refrigerator, a cabinet, a storage container, a warehouse, etc.

The storage unit 1010 is any hardware suitable for storing data or executable computer code. The storage unit 1010 can include but is not limited to a hard drive, flash drive, non-volatile memory, volatile memory or any other type of computer readable storage medium. Any operation or method for a storage structure or refrigerator that is described in this application (e.g., methods 100, 200, 400, 700 and 900 of FIGS. 1, 2, 4, 7 and 9, respectively) may be stored in the form of executable computer code or instructions in the storage unit 1010. The execution of the computer code or instructions by the processor unit 1005 causes the storage structure 1000 or a suitable device coupled with the storage structure to perform any of the aforementioned operations or methods.

The network interface unit 1015 includes any hardware or software suitable for enabling the storage structure 1000 to communicate with external devices. In some embodiments, for example, the storage structure 1000 communicates messages and information to an external device (e.g., a smartphone, smart glasses, smartwatch, etc.) for display (e.g., as discussed in connection with step 130 of FIG. 1.) Additionally, the storage structure 1000 may transmit images and sensors data to an external device (e.g., a server) so that some or all of the processing of that data (e.g., steps 115 and 120 of FIG. 1) occurs at the external device. Any information obtained using the techniques described herein may be transmitted to an external device/server using the network interface unit 1015, so that it may be accessed by other devices. The network interface unit 2015 is arranged to transmit data and receive data using any suitable network (e.g., LAN, Internet, etc.) or communications protocol (e.g., Bluetooth, WiFi, NFC, IEEE 802.15.4, IEEE 802.11, etc.)

The camera/sensor unit 1035 includes one or more cameras, sensors or other monitoring devices that may be positioned at, near, on and/or inside the storage structure. The cameras/sensors are arranged to be operated using any technique described herein e.g., as described in connection with step 110 of FIG. 1, step 205 of FIG. 2, step 405 of FIG. 4, step 705 and 710 of FIG. 7 and/or method 900 of FIG. 9.

The scanner unit 1030 includes one or more scanners. The scanner(s) is/are arranged to obtain detailed information regarding a scanned object. Any suitable scanner may be used. In some embodiments, for example, the scanner is a near infrared (NIR) scanner. The scanner is arranged to be operated using any scanning technique described herein e.g., method 400 of FIG. 4.

The inventory control module 1025 is any hardware or software that is used to perform operations related to the monitoring or updating of inventory in the storage structure 1000. The module 1025 is arranged to perform or coordinate any operation that relates to the collection and analysis of images and/or sensor data, the identification of objects and directional movement, the scanning of objects, and the corresponding updating of the inventory records database e.g., any operation described in connection with methods 100, 200, 400 and 700 of FIGS. 1, 2, 4 and 7. In various embodiments, the inventory control module 1024 coordinates and operates the camera unit 1035, the scanner unit 1030 and/or other features and devices of the storage structure 1000.

The inventory record database 1040 is any hardware of software used to store any information relating to the inventory of the storage structure 1000. In some embodiments, for example, the database 1040 includes a current inventory of all detected objects in the storage structure 1000. Additional information about each object may also be stored in the database 1040 e.g., the name of the object, the time and/or date the object was placed in the storage structure, the expiration date of the object, and features, categories or other notes that relates to the object, etc. The database 1040 may also contain historical information. That is, in various implementations, the inventory record database stores historical records over time of the inventory in the storage structure. Any suitable database technology or hardware may be used to store the records. Any operation involving an inventory record database that is described herein may be performed using the inventory record database 1040.

The display unit 1020 is any hardware or software arranged to display information for a user. Any suitable display technology may be used to display information e.g., a touch sensitive (capacitive) screen, an e-ink display, an LCD or OLED display, etc. The storage structure 1000 may display any kind of message or information described herein at the display unit 1020 e.g., as discussed in connection with step 130 of FIG. 1, step 245 of FIG. 2, step 425 of FIG. 4 and step 720 of FIG. 7. It should be noted that in various implementations, any of the above information is (also) conveyed to the user via audio statements from a speaker coupled with the storage structure 1000. In still other embodiments, the storage structure 1000 is arranged to transmit any such messages or information via a wired or wireless network to an external device (e.g., smart watch, smartphone, computer glasses, laptop, computer, etc.) for display.

This application describes various operations for collecting data (e.g., images, scanning data, etc.), analyzing the data, and then updating inventory records based on the analysis and the data. In some of the examples described herein, a storage structure performs these steps. However, it should be noted that the collection and processing of data can also occur at a remote device, such as a server. That is, in various implementations, the storage structure acquires data (e.g., steps 105 and 110 of FIG. 1; steps 205 and 215 of FIG. 2; and steps 405, 410 and 415 of FIG. 4). Afterward, the storage structure transmits the data to a remote device (e.g., a cloud server) over a suitable network (e.g., an intranet or the Internet.) The remote device then analyzes the data (e.g., steps 115 and 120 of FIG. 1, steps 210-235 of FIG. 2, step 420 of FIG. 4.) In various embodiments, the remote device then transmits the results of the analysis (e.g., motion direction, object identification, inventory records etc.) to the storage structure for storing. The storage structure uses the received results to update a local inventory records database (e.g., steps 125, 240, and 715 of FIGS. 1, 2 and 7.) Alternatively, the inventory records database is stored at the remote device, and the updating occurs therein. That is, in some approaches, all processing and storage of inventory-related data is performed at a remote device, and the role of the storage structure is primarily to obtain imaging/sensor/scanning data and to display messages and information to a user. In various embodiments, the storage structure receives information to display (e.g., inventory-related data, quality information, information related to an object, etc.) from the external device, either in response to a request from the storage structure/user and/or due to the pushing of information by the external device to the storage structure.

This application describes various storage structure designs and methods. It should be noted that any feature or component of a storage structure in one figure can be incorporated into the storage structure of any other figure. Also, any operation from one method may be included in any other method described herein. By way of example, this application contemplates some embodiments in which a storage structure performs the methods 100, 200, 400 and 700 of FIGS. 1, 2, 4 and 7. Additionally, the storage structure includes all the features and components of the storage structures illustrated in FIGS. 3, 5A, 8 and 10. Additionally, the storage structure is arranged to display information based on the identification and scanning of an object, as discussed in connection with FIGS. 6A-6C.

In this application, there are references to a storage structure that performs various operations (e.g., detect a motion, acquire images, determine a direction of the motion of an object, operations referenced in FIGS. 1, 2, 4 and 7.) It should be appreciated that in some embodiments, these same operations are performed by a storage system (e.g., storage system 300) and/or one or more control devices coupled with the storage structure. A simplified example may be described as follows. A storage system includes a storage structure, a control device, and cameras/sensors (e.g., as described in FIG. 10.) The control device is coupled with the cameras/sensors and/or is positioned in or coupled with the storage structure. A carrier carries an object into the storage structure. The control device, using the cameras/sensors, detects the motion of the object (e.g., step 105 of FIG. 1), acquires images (e.g., step 110), determines a direction of the motion of the object (e.g., step 115) and identifies the object (e.g., step 120.) In another example implementation, the cameras and/or sensors are separate from the control device but are coupled with the control device through a network. Thus, a sensor device detects the motion of the object (e.g., step 105). A camera device acquires images (e.g., step 110). The sensor and camera devices transmit their sensor and image data, respectively, to the control device, which determines a direction of the motion of the object (e.g., step 115) and identifies the object (e.g., step 120.) Put another way, any of the operations attributed to the storage structure in this application may also be performed by any suitable storage system and/or combination of one or more separate, networked devices coupled with and/or positioned in or nearby the storage structure.

Although only a few embodiments of the invention have been described in detail, it should be appreciated that the invention may be implemented in many other forms without departing from the spirit or scope of the invention. For example, the present application and figures describe various methods that perform particular operations. It should be appreciated that in some embodiments, one or more of these operations/steps may be modified, reordered and/or deleted. Additionally, some figures, such as FIGS. 3, 5A, 5B, 8 and 10, describe devices that contain various components. It should be noted that in some embodiments, one or more of these components may be merged together. In still other embodiments, one or more components may be separated into a greater number of components. The features of one component may be transferred to another and/or modified as appropriate. Each device may have additional components beyond what is shown in the corresponding figure. Particular modules or devices that are shown as being part of a particular object may instead be coupled with the object e.g., with a wired or wireless connection. In FIG. 10, for example, a camera unit may be part of the storage structure; alternatively, the camera unit may be part of a storage system, which includes the storage structure and a camera unit that is coupled with the storage structure. Therefore, the present embodiments should be considered illustrative and not restrictive and the invention is not to be limited to the details given herein.

What is claimed is:

1. A method for identifying an object at a storage structure, the method comprising:
    detecting a motion of the object at the storage structure using one or more sensors coupled to the storage structure;
    in response to detecting the motion of the object, acquiring one or more images of at least a part of the object while the object is in motion;
    identifying the object based on the one or more images acquired while the object is in motion;
    obtaining scanning data from a scanner indicating a characteristic of the object, the characteristic comprising a quality and a bacteria count;
    tracking a user's consumption based on the object and direction of the motion of the object, wherein the user's consumption is tracked according to the characteristic of the object and recorded in inventory records data;
    analyzing the user's consumption to determine a user's nutritional consumption statistic associated with the characteristic of the object and the bacteria count; and
    providing a message related to the user's nutritional consumption statistic and at least part of the characteristic of the object.

2. The method as recited in claim 1, further comprising:
    determining the direction of the motion of the object based on the acquired one or more images and detecting the object moving into an interior or from the interior of the storage structure.

3. The method of claim 2, further comprising:
    based on the direction of the motion of the object, determining whether the object is being added to or removed from the storage structure.

4. The method of claim 2, wherein the storage structure is a refrigerator.

5. The method of claim 2, further comprising:
    updating the inventory records data for the storage structure based on the object and the direction of the motion of the object,
    wherein the inventory records data reflects a time and date particular actions occur.

6. The method of claim 5, further comprising:
    displaying information based on the inventory records data.

7. The method of claim 1, further comprising:
    detecting a carrier moving through an entrance area of the storage structure;
    determining whether the carrier is carrying the object;
    determining a direction of movement of the carrier; and
    based on the direction of movement of the carrier and whether the carrier is carrying the object, updating the inventory records data for the storage structure.

8. The method of claim 7, further comprising:
    determining that the carrier is moving towards the storage structure during a first time;
    determining whether the carrier is carrying the object during the first time;
    determining that the carrier is moving away from the storage structure during a second time; and
    determining whether the carrier is carrying the object during the second time.

9. The method of claim 8, further comprising:
    when it is determined that the carrier is not carrying the object during the first time and the carrier is carrying the object during the second time, adjusting the inventory records data to indicate that the object has been removed from the storage structure.

10. The method of claim 8, further comprising:
when it is determined that the carrier is carrying the object during the first time and is not carrying an object during the second time, adjusting the inventory records data to indicate that the object has been added to the storage structure.

11. The method of claim 8, wherein the carrier is one of a hand of a user, a vehicle, or a structure that is capable of carrying the object.

12. The method of claim 1, further comprising:
detecting a presence of the object within a scanning range of the scanner coupled to the storage structure;
scanning, by the scanner, the object; and
storing characteristic information about the object based on the scanning data.

13. The method of claim 12, wherein the scanner is a near infrared (NIR) scanner.

14. The method of claim 1, wherein the message differs depending upon whether the object is one of: 1) a fermented food; 2) a fresh product; or 3) a food item in a particular state.

15. The method of claim 1, further comprising:
detecting a closing of a door to the storage structure;
capturing, by one or more cameras while the door is closing, the one or more images including an interior of the storage structure; and
updating the inventory records data based on the one or more images including the interior of the storage structure.

16. The method as recited in claim 1, wherein the scanner uses a chemometric or NIR spectroscopy method to scan the object.

17. A non-transitory computer readable medium including a plurality of instructions that, when executed by a processor, cause the processor to:
detect a motion of an object at a storage structure using one or more sensors coupled to the storage structure;
in response to detecting the motion of the object, acquire one or more images of at least a part of the object while the object is in motion;
identify the object based on the one or more images acquired while the object is in motion;
obtain scanning data from a scanner indicating a characteristic of the object, the characteristic comprising a quality and a bacteria count;
track a user's consumption based on the object and direction of the motion of the object, wherein the user's consumption is tracked according to the characteristic of the object and recorded in inventory records data;
analyze the user's consumption to determine a user's nutritional consumption statistic associated with the characteristic of the object and the bacteria count; and
provide a message related to the user's nutritional consumption statistic and at least part of the characteristic of the object.

18. The non-transitory computer readable medium of claim 17, wherein the plurality of instructions further cause the processor to:
determine the direction of the motion of the object based on the one or more images and to detect the object moving into an interior or from the interior of the storage structure.

19. The non-transitory computer readable medium of claim 18, wherein the plurality of instructions further cause the processor to:
determine whether the object is being added to or removed from the storage structure based on the direction of the motion of the object.

20. The non-transitory computer readable medium of claim 18, wherein the plurality of instructions further cause the processor to:
update the inventory records data for the storage structure based on the object and the direction of the motion of the object, wherein the inventory records data reflects a time and date particular actions occur.

21. The non-transitory computer readable medium of claim 17, wherein the plurality of instructions further cause the processor to:
detect a carrier moving through an entrance area of the storage structure;
determine the carrier is carrying the object;
determine a direction of movement of the carrier; and
update the inventory records data for the storage structure based on the direction of the movement of the carrier and the determination that the carrier is carrying the object.

22. The non-transitory computer readable medium as recited in claim 17, wherein the scanner uses a chemometric or NIR spectroscopy method to scan the object.

23. A storage system comprising:
a storage structure;
one or more sensors coupled to the storage structure; and
at least one processor coupled to the storage structure and configured to:
detect a motion of an object at the storage structure using the one or more sensors;
in response to detecting the motion of the object, acquire one or more images of at least a part of the object while the object is in motion; and
identify the object based on the one or more images acquired while the object is in motion;
obtain scanning data from a scanner indicating a characteristic of the object, the characteristic comprising a quality and a bacteria count;
track a user's consumption based on the object and direction of the motion of the object, wherein the user's consumption is tracked according to the characteristic of the object and recorded inventory records data;
analyze the user's consumption to determine a user's nutritional consumption statistic associated with the characteristic of the object and the bacteria count; and
provide a message related to the user's nutrition consumption statistic and at least part of the characteristic of the object.

24. The storage system of claim 23, wherein the at least one processor is further configured to:
determine the direction of the motion of the object based on the one or more images and to detect the object moving into an interior or from the interior of the storage structure.

25. The storage system of claim 24, wherein the at least one processor is further configured to:
based on the direction of the motion of the object, determine whether the object is being added to or removed from the storage structure.

26. The storage system of claim 23, further comprising:
a display panel that is coupled to the storage structure for displaying messages for a user;
wherein the scanner, coupled to the storage structure, is arranged to scan and obtain data relating to the characteristic of the object; and one or more cameras coupled to the storage structure and arranged to acquire the one or more images, wherein the at least one processor is further configured to:
   display information to the user at the display panel based on an identity of the object and the characteristic of the object.

27. The storage system as recited in claim 23, wherein the scanner uses a chemometric or NIR spectroscopy method to scan the object.

\* \* \* \* \*